(12) United States Patent
Kito et al.

(10) Patent No.: US 11,279,871 B2
(45) Date of Patent: Mar. 22, 2022

(54) CERAMIC COMPOSITE, LIGHT SOURCE APPARATUS, AND PROJECTOR (71) Applicant: SEIKO EPSON CORPORATION, Tokyo (JP)

(72) Inventors: Satoshi Kito, Chino (JP); Osamu Arakawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/934,070

(22) Filed: Jul. 21, 2020

(65) Prior Publication Data
US 2021/0024818 A1 Jan. 28, 2021

(30) Foreign Application Priority Data

Jul. 22, 2019 (JP) .............................. JP2019-134358

(51) Int. Cl.
C09K 11/02 (2006.01)
G03B 21/20 (2006.01)
G02B 26/00 (2006.01)

(52) U.S. Cl.
CPC ............ C09K 11/02 (2013.01); G02B 26/008 (2013.01); G03B 21/204 (2013.01)

(58) Field of Classification Search
CPC ..... C09K 11/02; G02B 26/008; G03B 21/204
See application file for complete search history.

(56) References Cited

U.S. PATENT DOCUMENTS

| 2008/0187746 A1 | 8/2008 | De Graaf et al. |
| 2011/0181173 A1 | 7/2011 | De Graaf et al. |
| 2012/0045634 A1 | 2/2012 | Irie et al. |
| 2013/0163225 A1* | 6/2013 | Nakatsu ................. G03B 33/06 362/84 |
| 2014/0254133 A1* | 9/2014 | Kotter .................. H04N 9/3111 362/84 |
| 2016/0115379 A1* | 4/2016 | Kida ...................... H01L 33/501 257/98 |
| 2017/0244939 A1* | 8/2017 | Arakawa ............... F21V 29/502 |
| 2018/0166849 A1* | 6/2018 | Egawa ................. G03B 21/208 |
| 2019/0040313 A1* | 2/2019 | Pousthomis ......... C09K 11/025 |

(Continued)

FOREIGN PATENT DOCUMENTS

| JP | 2008-533270 A | 8/2008 |
| JP | 2012-062459 A | 3/2012 |

(Continued)

OTHER PUBLICATIONS

WO2018055903A1 Mar. 2018; WO; Kobayashi Izushi (Year: 2018).*
Machine English Translation of JP-2017138573-A; Ikeda (Year: 2017).*

Primary Examiner — Rajarshi Chakraborty
Assistant Examiner — Glenn D Zimmerman
(74) Attorney, Agent, or Firm — Oliff PLC (57) ABSTRACT A ceramic composite according to the present disclosure has a phosphor phase containing an activator and a phosphor and a matrix phase containing MgO as a light transmissive ceramic material. The ceramic composite is made of an inorganic material, and the content of the phosphor phase is so set that the volume ratio of the phosphor phase to the entire phase including the matrix phase and the phosphor phase is lower than or equal to 20 vol %.

13 Claims, 6 Drawing Sheets (56) References Cited

U.S. PATENT DOCUMENTS

| | | | | |
|---|---|---|---|---|
| 2019/0186711 A1* | 6/2019 | Lenef | ........................ | F21V 7/30 |
| 2019/0211263 A1* | 7/2019 | Maeda | ................... | C09K 11/08 |
| 2019/0250492 A1* | 8/2019 | Kashihara | ................ | H04N 5/74 |
| 2021/0139770 A1* | 5/2021 | Pousthomis | ....... | C09K 11/0883 |

FOREIGN PATENT DOCUMENTS

| | | | | |
|---|---|---|---|---|
| JP | 2017138573 A * | 8/2017 | | |
| WO | WO-2017040433 A1 * | 3/2017 | ........... | G03B 21/204 |
| WO | WO-2017214464 A1 * | 12/2017 | ................ | F21V 7/30 |
| WO | WO-2018055903 A1 * | 3/2018 | ................ | F21V 9/08 |
| WO | WO-2018070253 A1 * | 4/2018 | ................ | H04N 5/74 |

* cited by examiner

CERAMIC COMPOSITE, LIGHT SOURCE APPARATUS, AND PROJECTOR

The present application is based on, and claims priority from JP Application Serial Number 2019-134358, filed Jul. 22, 2019, the disclosure of which is hereby incorporated by reference herein in its entirety.

BACKGROUND

1. Technical Field

The present disclosure relates to a ceramic composite, a light source apparatus, and a projector.

2. Related Art

There has been a proposed light source apparatus using fluorescence emitted from a phosphor when the phosphor is irradiated with excitation light outputted from a light source. When the phosphor is irradiated with the excitation light, the phosphor absorbs the excitation light, and the temperature of the phosphor therefore increases. However, the light emission efficiency of the phosphor decreases as the temperature of the phosphor increases, resulting in a decrease in the amount of emitted fluorescence. It is therefore necessary to improve the heat dissipation performance.

There has been a proposed phosphor having increased thermal conductivity that allows improved heat dissipation performance. JP-T-2008-533270 and JP-A-2012-062459 each disclose a phosphor formed of a ceramic matrix made of alumina in which YAG phosphor particles to which an activator has been doped are dispersed. In the phosphor disclosed in JP-T-2008-533270, the content of the phosphor phase is so set that the volume ratio of the phosphor phase to the entire phase including the matrix phase and the phosphor phase ranges from 0.01 vol % to 20 vol %. In the phosphor disclosed in JP-A-2012-062459, the content of the phosphor phase is so set that the volume ratio of the phosphor phase to the entire phase including the matrix phase and the phosphor phase ranges from 22 vol % to 55 vol %.

When any of the phosphors disclosed in JP-T-2008-533270 and JP-A-2012-062459 is used with a light source apparatus for projector, further improvement in heat dissipation performance is required.

SUMMARY

A ceramic composite according to a first aspect of the present disclosure includes a phosphor phase containing an activator and a phosphor and a matrix phase containing MgO as a light transmissive ceramic material. The ceramic composite is made of an inorganic material, and a content of the phosphor phase is so set that a volume ratio of the phosphor phase to an entire phase including the matrix phase and the phosphor phase is lower than or equal to 20 vol %.

In the ceramic composite according to the first aspect described above, the phosphor phase may contain at least any one of $Y_3Al_5O_{12}$, $Y_3(Al,Ga)_5O_{12}$, $Lu_3Al_5O_{12}$, $TbAl_5O_{12}$, and $(Y,Gd)Al_5O_{12}$.

In the ceramic composite according to the first aspect described above, the matrix phase may further contain at least any one of $Al_2O_3$, $ZnO$, $TiO_2$, $Y_2O_3$, $YAlO_3$, $BeO$, and $MgAl_2O_4$.

In the ceramic composite according to the first aspect described above, the activator added to the phosphor phase may contain at least any one of Ce and Eu.

A light source apparatus according to a second aspect of the present disclosure includes the ceramic composite described above and a light source that outputs excitation light that excites the ceramic composite to cause the ceramic composite to produce fluorescence.

In the light source apparatus according to the second aspect described above, the ceramic composite may emit the fluorescence via a light exiting surface different from a light incident surface on which the excitation light is incident.

In the light source apparatus according to the second aspect described above, the ceramic composite may output part of the excitation light as transmitted light via the light exiting surface, and a ratio of an amount of the fluorescence emitted from the ceramic composite to an amount of the transmitted light may range from 30% to 50%.

In the light source apparatus according to the second aspect described above, a thickness of the ceramic composite may be greater than or equal to 40 μm.

In the light source apparatus according to the second aspect described above, the ceramic composite may be a fixed-type phosphor so configured that a light incident position where the excitation light is incident on the ceramic composite does not temporally change.

The light source apparatus according to the second aspect described above may further include a substrate that supports the ceramic composite and a drive apparatus that rotates the substrate around a predetermined axis of rotation.

A projector according to a third aspect of the present disclosure includes the light source apparatus according to the second aspect described above, a light modulator that modulates light outputted from the light source apparatus in accordance with image information to form image light, and a projection optical apparatus that projects the image light.

DESCRIPTION OF EXEMPLARY EMBODIMENTS

Embodiments of the present disclosure will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Figure 1:
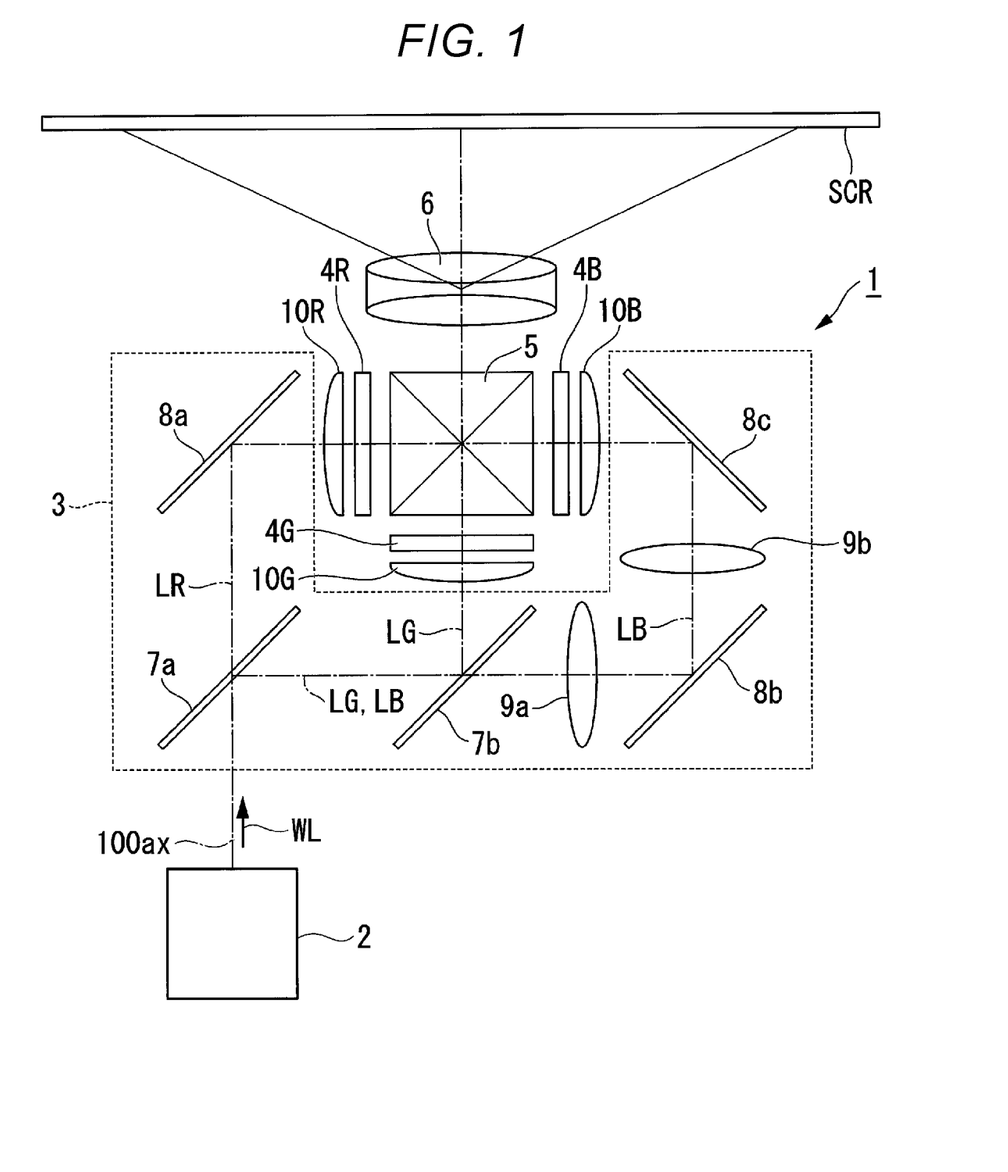
FIG. 1 shows a schematic configuration of a projector according to a first embodiment.
Figure 2:
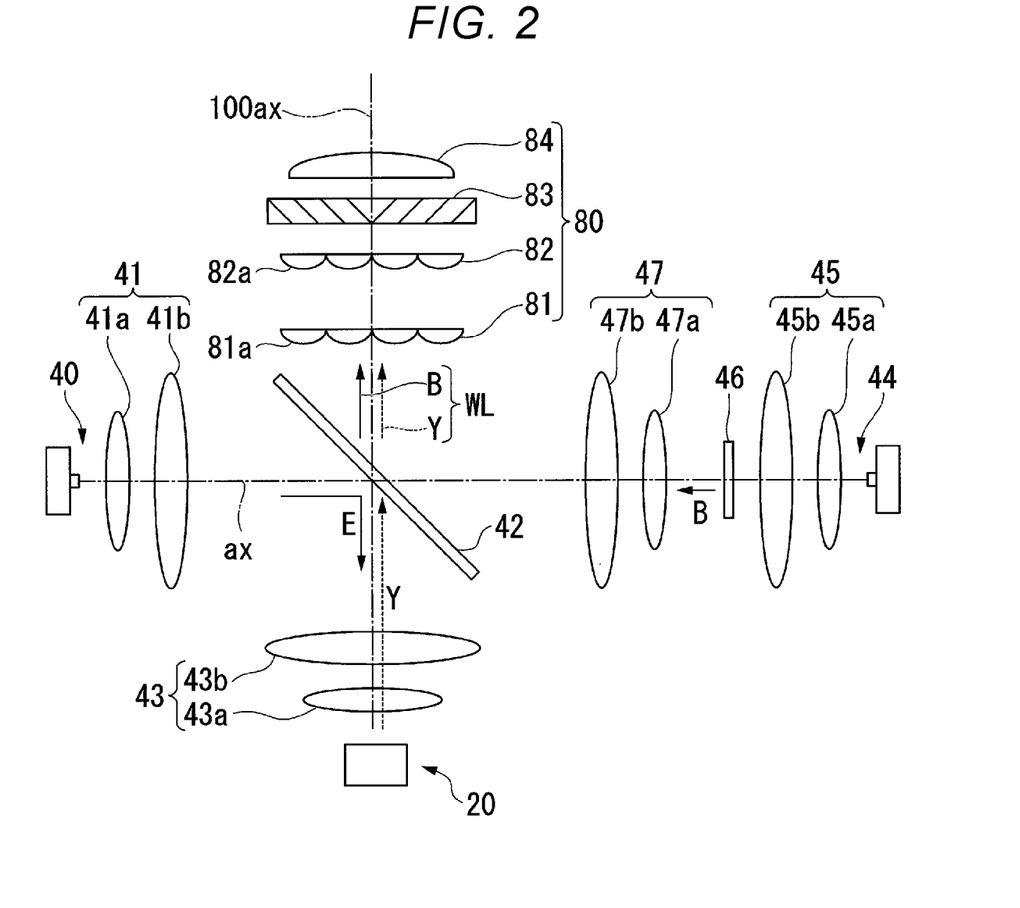
FIG. 2 shows a schematic configuration of a light source apparatus.

FIG. 1 shows a schematic configuration of a projector according to a first embodiment. FIG. 2 shows a schematic configuration of a light source apparatus.

A projector 1 according to the present embodiment is a projection-type image display apparatus that displays video images on a screen SCR, as shown in FIG. 1. The projector 1 includes a light source apparatus 2, a color separation system 3, a light modulator 4R, a light modulator 4G, a light modulator 4B, a light combining system 5, and a projection optical apparatus 6.

The light source apparatus 2 outputs white illumination light WL toward the color separation system 3.

The color separation system 3 separates the illumination light WL outputted from the light source apparatus 2 into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the red light LR and reflects the other light (green light LG and blue light LB). On the other hand, the second dichroic mirror 7b reflects the green light LG and transmits the blue light LB to separate the other light (green light LG and blue light LB) into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a and the second relay lens 9b are disposed in the optical path of the blue light LB on the light exiting side of the second total reflection mirror 8b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR in accordance with image information to form an image light flux corresponding to the red light LR. The light modulator 4G modulates the green light LG in accordance with image information to form an image light flux corresponding to the green light LG. The light modulator 4B modulates the blue light LB in accordance with image information to form an image light flux corresponding to the blue light LB.

The light modulators 4R, 4G, and 4B are each formed, for example, of a transmissive liquid crystal panel. Polarizers (not shown) are disposed on the light incident and exiting sides of each of the liquid crystal panels.

Field lenses 10R, 10G, and 10B are disposed on the light incident side of the light modulators 4R, 4G, and 4B, respectively. The field lenses 10R, 10G, and 10B parallelize the red light LR, the green light LG, and the blue light LB to be incident on the light modulators 4R, 4G, and 4B, respectively.

The image light fluxes from the light modulators 4R, 4G, and 4B enter the light combining system 5. The light combining system 5 combines the image light fluxes corresponding to the red light LR, the green light LG, and the blue light LB with one another and outputs the combined image light toward the projection optical apparatus 6. The light combining system 5 is formed, for example, of a cross dichroic prism.

The projection optical apparatus 6 is formed of a projection lens group, enlarges the combined image light from the light combining system 5, and projects the enlarged image light toward the screen SCR. Enlarged video images are thus displayed on the screen SCR.

Light Source Apparatus

The configuration of the light source apparatus 2 will subsequently be described.

The light source apparatus 2 includes a first light source 40, a collimation system 41, a dichroic mirror 42, a collimation/light convergence system 43, a wavelength converter 20, a second light source 44, a light convergence system 45, a diffuser 46, and a collimation system 47, as shown in FIG. 2.

The first light source 40 is formed of a plurality of semiconductor lasers 40a, which each output blue excitation light E formed of laser light. The intensity of the emitted excitation light E peaks, for example, at 445 nm. The plurality of semiconductor lasers 40a are arranged in an array in a single plane perpendicular to an optical axis ax of the first light source 40. The semiconductor lasers 40a may each instead be a semiconductor laser that outputs blue light having a wavelength other than 445 nm, for example, 455 nm or 460 nm. The optical axis ax of the first light source 40 is perpendicular to an illumination optical axis 100ax of the light source apparatus 2.

The collimation system 41 includes a first lens 41a and a second lens 41b. The collimation system 41 substantially parallelizes the light outputted from the first light source 40. The first lens 41a and the second lens 41b are each formed of a convex lens.

The dichroic mirror 42 is so disposed in the optical path from the collimation system 41 to the collimation/light convergence system 43 as to incline by 45° with respect to the optical axis ax of the first light source 40 and the illumination optical axis 100ax. The dichroic mirror 42 reflects the excitation light E formed of a blue light component and transmits yellow fluorescence Y containing a red light component and a green light component.

The collimation/light convergence system 43 causes the excitation light E reflected off the dichroic mirror 42 to converge and enter the wavelength converter 20 and substantially parallelizes the fluorescence Y emitted from the wavelength converter 20. The collimation/light convergence system 43 includes a first lens 43a and a second lens 43b. The first lens 43a and the second lens 43b are each formed of a convex lens.

The second light source 44 is formed of a semiconductor laser that outputs light that belongs to the same wavelength band as the wavelength band to which the light from the first light source 40 belongs. The second light source 44 may be formed of a single semiconductor laser or a plurality of semiconductor lasers. The second light source 44 may instead be formed of a semiconductor laser that outputs light that belongs to a wavelength band different from that the wavelength band to which the light from the semiconductor lasers of the first light source 40 belongs.

The light convergence system 45 includes a first lens 45a and a second lens 45b. The light convergence system 45 causes blue light B outputted from the second light source 44 to converge to a point on the diffusion surface of the diffuser 46 or in the vicinity of the diffuser 46. The first lens 45a and the second lens 45b are each formed of a convex lens.

The diffuser 46 diffuses the blue light B outputted from the second light source 44 to produce blue light B having a light orientation distribution close to the light orientation distribution of the fluorescence Y emitted from the wavelength converter 20. The diffuser 46 can be formed, for example, of a ground glass plate made of optical glass.

The collimation system 47 includes a first lens 47a and a second lens 47b. The collimation system 47 substantially parallelizes the light having exited out of the diffuser 46. The first lens 47a and the second lens 47b are each formed of a convex lens.

The blue light B outputted from the second light source 44 is reflected off the dichroic mirror 42 and combined with the fluorescence Y having been emitted from the wavelength converter 20 and having passed through the dichroic mirror 42 to produce the white illumination light WL. The illumination light WL enters a uniform illumination system 80.

The uniform illumination system 80 includes a first lens array 81, a second lens array 82, a polarization converter 83, and a superimposing lens 84.

The first lens array 81 includes a plurality of first lenses 81a for dividing the illumination light WL from the light source apparatus 2 into a plurality of sub-light fluxes. The plurality of first lenses 81a are arranged in a matrix in a plane perpendicular to the illumination optical axis 100ax.

The second lens array 82 includes a plurality of second lenses 82a corresponding to the plurality of first lenses 81a of the first lens array 81. The plurality of second lenses 82a are arranged in a matrix in a plane perpendicular to the illumination optical axis 100ax.

The second lens array 82 along with the superimposing lens 84 forms images of the first lenses 81a of the first lens array 81 in the vicinity of an image formation region of each of the light modulators 4R, 4G, and 4B.

The polarization converter 83 converts the light having exited out of the second lens array 82 into linearly polarized light. The polarization converter 83 includes, for example, polarization separation films and retardation films (not shown).

The superimposing lens 84 causes the sub-light fluxes having exited out of the polarization converter 83 to converge and superimposes the sub-light fluxes with one another in the vicinity of the image formation region of each of the light modulators 4R, 4G, and 4B.

Wavelength Converter

Figure 3:
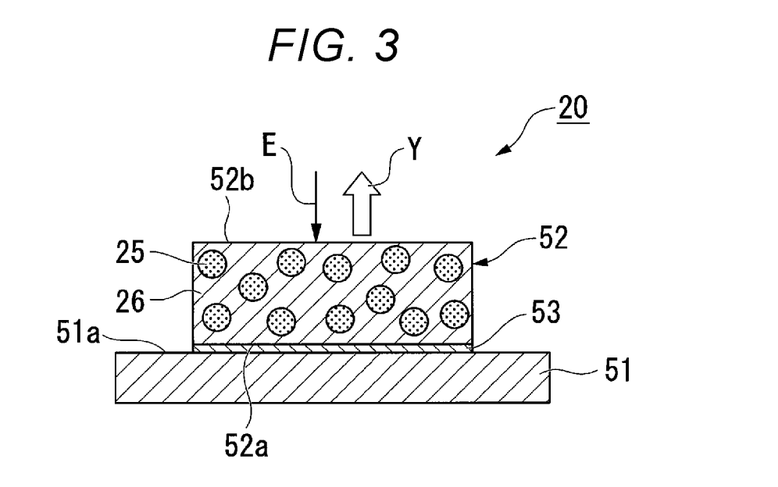
FIG. 3 is a cross-sectional view showing the configurations of key parts of a wavelength converter.

The configuration of the wavelength converter 20 will next be described. FIG. 3 is a cross-sectional view showing the configurations of key parts of the wavelength converter 20. FIG. 3 corresponds to the cross section of the wavelength converter 20 taken along a plane containing the illumination optical axis 100ax shown in FIG. 2.

The wavelength converter 20 includes a substrate 51, a ceramic phosphor 52, and a reflection layer 53, as shown in FIG. 3. The substrate 51 is made of a metal material that excels in heat dissipation performance, for example, aluminum and copper. The reflection layer 53 is provided on a first surface 51a of the substrate 51 and is formed of a metal film made, for example, of silver. The wavelength converter 20 of the present embodiment is a fixed-type wavelength converter so configured that a light incident position where the excitation light E is incident on the ceramic phosphor 52 does not temporally change.

The ceramic phosphor 52 has a first surface 52a, on which the excitation light E outputted from the first light source 40 is incident, and a second surface 52b, which differs from the first surface 52a.

The ceramic phosphor 52 is a reflective wavelength conversion layer that causes the fluorescence Y produced by the excitation light E incident via the first surface 52a to exit via the first surface 52a.

The ceramic phosphor 52 has a phosphor phase 25 and a matrix phase 26. The phosphor phase 25 contains an oxide phosphor to which an activator has been added. The phosphor phase 25 is formed of a plurality of phosphor particles. The phosphor phase 25 contains, for example, yttrium aluminum garnet to which cerium (Ce) has been added as the activator (YAG($Y_3Al_5O_{12}$):Ce).

In the case of YAG:Ce byway of example, the phosphor particles can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, or a thermal plasma method, or any other gas-phase method.

The oxide phosphor that forms the phosphor phase 25 may contain at least any one of $Y_3(Al,Ga)_5O_{12}$, $Lu_3Al_5O_{12}$, and $TbAl_5O_{12}$ as well as $Y_3Al_5O_{12}$. The phosphor phase 25 may contain europium (Eu) as the activator in place of cerium (Ce).

The matrix phase 26 functions as a binder that bonds the plurality of phosphor particles, which form the phosphor phase 25, to each other. The matrix phase 26 is made of a material containing MgO (magnesium oxide) as a light transmissive ceramic material. The magnesium oxide that forms the matrix phase 26 has thermal conductivity of about 50 W/m·K, and the YAG that forms the phosphor phase 25 has thermal conductivity of about 12 W/m·K. In the present embodiment, the matrix phase 26 contains a light transmissive ceramic material having thermal conductivity higher than that of the phosphor phase 25.

The metal oxide that forms the matrix phase 26 may contain at least any one of $Al_2O_3$, ZnO, $TiO_2$, $Y_2O_3$, $YAlO_3$, BeO, and $MgAl_2O_4$ in addition to MgO described above.

The thermal conductivity of $Al_2O_3$ is about 30 W/m·K. The thermal conductivity of ZnO is about 25 W/m·K. The thermal conductivity of $TiO_2$ is about 43 W/m·K. The thermal conductivity of $Y_2O_3$ is about 27 W/m·K. The thermal conductivity of $YAlO_3$ is about 12 W/m·K. The thermal conductivity of BeO is about 250 W/m·K. The thermal conductivity of $MgAl_2O_4$ is about 14 W/m·K.

In the ceramic phosphor 52 of the present embodiment, the content of the phosphor phase 25 is so set that the volume ratio of the phosphor phase 25 to the entire phase including the matrix phase 26 and the phosphor phase 25 is lower than or equal to 20 vol %. In the present specification, the volume ratio of the phosphor phase 25 to the entire phase including the matrix phase 26 and the phosphor phase 25 is hereinafter referred to as a YAG ratio.

The ceramic phosphor 52 having the configuration described above can be manufactured, for example, by carrying out the following steps.

Predetermined amounts of $Al_2O_3$ powder, $Y_2O_3$ powder, and $CeO_2$ powder, which are raw powder materials of YAG:Ce, are mixed with a predetermined amount of ethanol, and ball milling is performed on the resultant mixture in a pot to produce slurry. The slurry is dried for granulation, and grease is then removed from the resultant granule, followed by sintering of the degreased granule. YAG:Ce powder is thus produced.

A predetermined amount of YAG:Ce powder produced by carrying out the steps described above, MgO powder, and a predetermined amount of ethanol are mixed with one another, and ball milling is performed on the resultant mixture in a pot to produce slurry. The slurry is then dried for granulation, and molding, degreasing, and sintering are sequentially performed on the granule. The ceramic phosphor 52 of the present embodiment, which is formed of a composite sintered compact including YAG:Ce, YAG, and MgO (magnesium oxide), can thus be produced. To increase the density of the sintered compact, hot isotropic pressurizing in which the sintering is performed under pressure may be performed on the sintered compact.

Actions and effects of the wavelength converter 20 of the present embodiment will be described below.

The ceramic phosphor 52 of the present embodiment uses MgO (thermal conductivity: about 50 W/m·K), which has thermal conductivity higher than that of $Al_2O_3$ (thermal conductivity: about 30 W/m·K), as the light transmissive ceramic material, and the YAG ratio of the ceramic phosphor 52 is set at 20 vol % or lower. The thermal conductivity of the ceramic phosphor 52 is therefore be improved, whereby the heat in the ceramic phosphor 52 can be efficiently dissipated toward a heat dissipating substrate 51. Therefore, in the wavelength converter 20, the improvement in the heat dissipation performance of the ceramic phosphor 52 allows suppression of a decrease in the wavelength conversion efficiency at which the fluorescence Y is produced.

Therefore, in the light source apparatus 2 according to the present embodiment, the improvement in the heat dissipation performance of the ceramic phosphor 52 allows suppression of a decrease in the amount of fluorescence due to a decrease in the wavelength conversion efficiency of the ceramic phosphor 52.

Further, the projector 1 according to the present embodiment, which includes the light source apparatus 2 described above, can display a high-quality image.

Second Embodiment

A second embodiment of the present disclosure will be described below with reference to FIG. 4.

A schematic configuration of a projector according to the second embodiment is the same as that in the first embodiment, and the wavelength converter in the light source apparatus differs in terms of configuration from the wavelength converter of the first embodiment. Therefore, the configuration of the wavelength converter will be described and other configurations will not be described below.

Figure 4:
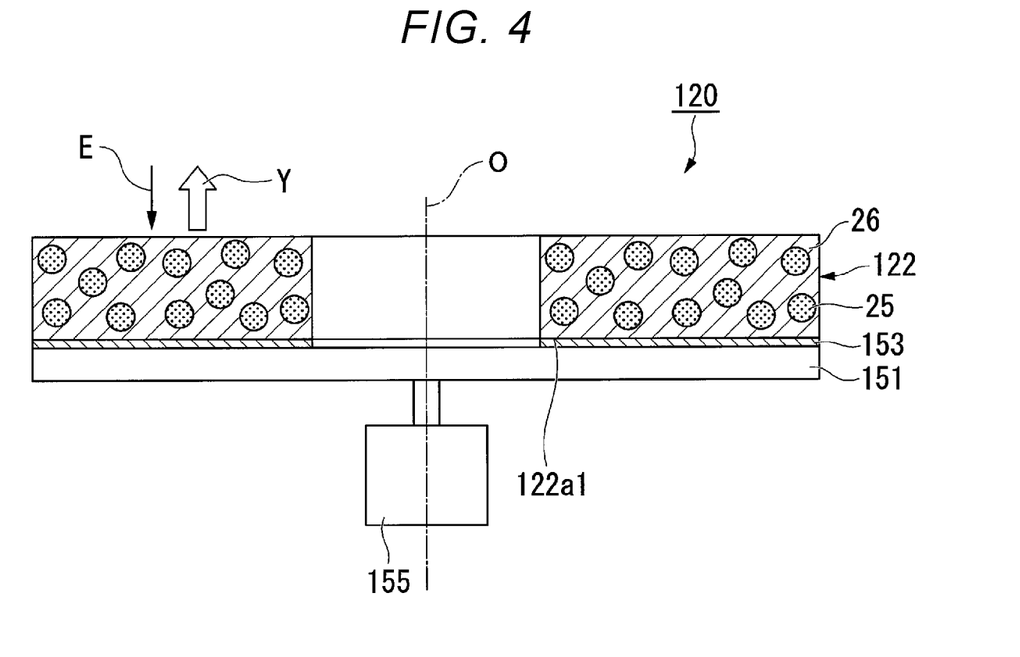
FIG. 4 is a cross-sectional view showing the configurations of key parts of a wavelength converter of a second embodiment.

FIG. 4 is a cross-sectional view showing the configurations of key parts of the wavelength converter of the present embodiment. A wavelength converter 120 of the present embodiment includes a substrate 151, a ceramic phosphor 122, a reflection layer 153, and a motor 155, as shown in FIG. 4. The wavelength converter 120 of the present embodiment is a rotary-wheel-type wavelength converter so configured that a light incident position where the excitation light E is incident on the ceramic phosphor 122 temporally changes.

The substrate 151 is made of a metal material that excels in heat dissipation performance, for example, aluminum and copper. The substrate 151 is rotatable around a predetermined axis of rotation O. The axis of rotation O passes through the center of the substrate 151. The motor 155 rotates the substrate 151 having the shape of a circular plate around the axis of rotation O.

The ceramic phosphor 122 of the present embodiment is formed in an annular shape around the axis of rotation O. The ceramic phosphor 122 is formed by shaping the ceramic phosphor 22 of the first embodiment in an annular form. The reflection layer 153 is provided between the substrate 151 and the ceramic phosphor 122. The substrate 151 dissipates heat generated in the ceramic phosphor 122.

In the wavelength converter 120 of the present embodiment, the excitation light E enters the rotating ceramic phosphor 122. When the excitation light E enters the ceramic phosphor 122, heat is generated in the ceramic phosphor 122. In the present embodiment, the motor 155 rotates the ceramic phosphor 122 to temporally move the light incident position where the excitation light E is incident on the ceramic phosphor 122. The configuration described above suppresses degradation of the ceramic phosphor 122 that occurs in the state in which the excitation light E keeps impinging on the same position on the ceramic phosphor 122 so that only part of the ceramic phosphor 122 is locally heated.

In the present embodiment, not only is the ceramic phosphor 212 rotated, but the ceramic phosphor 122 has the matrix phase 26 made of MgO, which has high thermal conductivity, whereby the heat dissipation performance can be further enhanced.

Also in the wavelength converter 120 of the present embodiment, a heat dissipating substrate 151, which is in contact with the ceramic phosphor 122, is formed of a non-light transmissive member. Therefore, in the wavelength converter 120, the fluorescence Y produced in the ceramic phosphor 122 is efficiently extracted out of the ceramic phosphor 122 with no leakage of the fluorescence Y into the heat dissipating substrate 151.

In the wavelength converter 120 of the present embodiment, improvement in the heat dissipation performance of the ceramic phosphor 122 allows suppression of a decrease in the wavelength conversion efficiency at which the fluorescence Y is produced. Therefore, in the light source apparatus according to the present embodiment, the improvement in the heat dissipation performance of the ceramic phosphor 122 allows suppression of a decrease in the amount of fluorescence due to a decrease in the wavelength conversion efficiency of the ceramic phosphor 122.

Third Embodiment

A third embodiment of the present disclosure will be described below with reference to FIG. 5.

A schematic configuration of a projector according to the third embodiment is the same as that in the first embodiment, and the light source apparatus differs in terms of configuration from the light source apparatus according to the first embodiment. Therefore, the configuration of the light source apparatus will be described and other configurations will not be described below.

Figure 5:
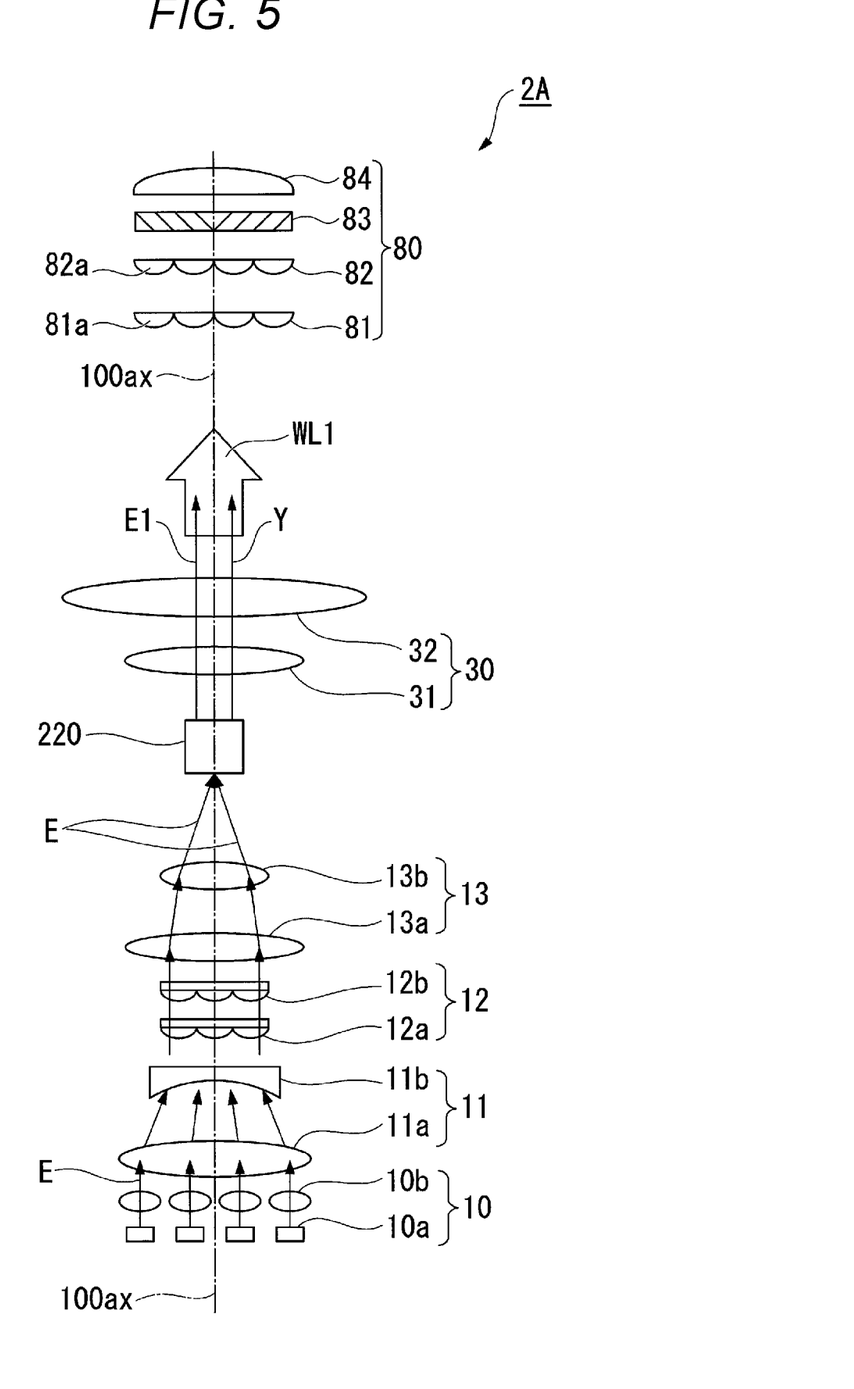
FIG. 5 shows a schematic configuration of a light source apparatus according to a third embodiment.

FIG. 5 shows a schematic configuration of a light source apparatus 2A.

The light source apparatus 2A includes an excitation light source unit 10, an afocal system 11, a homogenizer system 12, a light convergence system 13, a wavelength converter 220, a pickup system 30, and a uniform illumination system 80, as shown in FIG. 5.

The excitation light source unit 10 is formed of a plurality of semiconductor lasers 10a, which each output blue excitation light E formed of laser light and a plurality of collimator lenses 10b. The plurality of semiconductor lasers 10a are arranged in an array in a single plane perpendicular to the illumination optical axis 100ax. The collimator lenses 10b are arranged in an array in a single plane perpendicular to the illumination optical axis 100ax in correspondence with the semiconductor lasers 10a. The collimator lenses 10b each convert excitation light E outputted from corresponding semiconductor laser 10a into parallelized light.

The afocal system 11 includes, for example, a convex lens 11a and a concave lens 11b. The afocal system 11 reduces the light flux diameter of the excitation light E formed of the parallelized light fluxes outputted from the excitation light source unit 10.

The homogenizer system 12 includes, for example, a first multi-lens array 12a and a second multi-lens array 12b. The homogenizer system 12 converts the optical intensity distribution of the excitation light into a uniform state on the wavelength converter 220, which will be described later, what is called a top-hat distribution. The homogenizer system 12 along with the light convergence system 13 superimposes a plurality of narrow light fluxes having exited out of the plurality of lenses of the first multi-lens array 12a and the second multi-lens array 12b with one another on the wavelength converter 220. The optical intensity distribution of the excitation light E with which the wavelength converter 220 is irradiated is thus made uniform.

The light convergence system 13 includes, for example, a first lens 13a and a second lens 13b. In the present embodiment, the first lens 13a and the second lens 13b are each formed of a convex lens. The light convergence system 13 is disposed in the optical path from the homogenizer system 12 to the wavelength converter 220 and causes the excitation light E to converge and enter the wavelength converter 220. The configuration of the wavelength converter 220 will be described later.

The pickup system 30 includes, for example, a first collimation lens 31 and a second collimation lens 32. The pickup system 30 is a parallelizing system that substantially parallelizes the light having exited out of the wavelength converter 220. The first collimation lens 31 and the second collimation lens 32 are each formed of a convex lens. The light parallelized by the pickup system 30 enters the uniform illumination system 80.

Wavelength Converter

The configuration of the wavelength converter will next be described.

Figure 6:
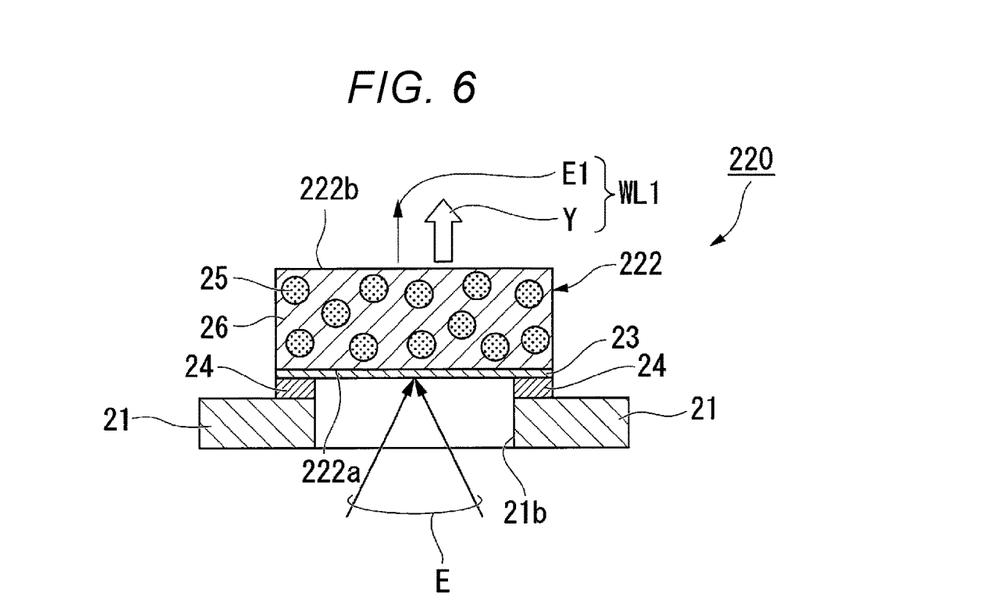
FIG. 6 is a cross-sectional view showing the configurations of key parts of a wavelength converter.

FIG. 6 is a cross-sectional view showing the configurations of key parts of the wavelength converter 220. FIG. 6 corresponds to the cross section of the wavelength converter 220 taken along a plane containing the illumination optical axis 100ax shown in FIG. 5.

The wavelength converter 220 includes a heat dissipating substrate 21, a ceramic phosphor 222, a dichroic film 23, and a bonding member 24, as shown in FIG. 6. The wavelength converter 220 of the present embodiment is formed of a fixed-type phosphor so configured that a light incident position where the excitation light E is incident on the ceramic phosphor 222 does not temporally change.

The heat dissipating substrate 21 is made of a metal material that excels in heat dissipation performance, for example, aluminum and copper. The heat dissipating substrate 21 is a support member that supports the ceramic phosphor 222. The ceramic phosphor 222 is fixed to the heat dissipating substrate 21 via the bonding member 24.

The heat dissipating substrate 21 in the present embodiment is formed of a non-light transmissive member. The heat dissipating substrate 21 is made of a metal material that excels in heat dissipation performance, for example, aluminum and copper.

The excitation light E enters the ceramic phosphor 222 via a through hole 21b formed in the heat dissipating substrate 21. That is, the heat dissipating substrate 21 is a member that is so provided as to be in contact with a region of the ceramic phosphor 222 that is the region different from the region on which the excitation light E is incident and dissipates heat generated in the ceramic phosphor 222. The heat dissipating substrate 21 is in contact with the ceramic phosphor 222 in the portion excluding the through hole 21b. In the present embodiment, a portion of the heat dissipating substrate 21 that is the portion in contact with the ceramic phosphor 222 is formed of the non-light-transmissive member.

The ceramic phosphor 222 has a light incident surface 222a, on which the excitation light E outputted from the excitation light source unit 10 is incident, and a light exiting surface 222b, which differs from the light incident surface 222a.

The ceramic phosphor 222 is a transmissive wavelength conversion layer that causes the fluorescence Y produced by the excitation light E incident via the light incident surface 222a to exit via the light exiting surface 222b.

The dichroic film 23 is provided on the light incident surface 222a of the ceramic phosphor 222. The dichroic film 23 is so characterized as to transmit the excitation light E and reflect the fluorescence Y emitted from the ceramic phosphor 222. Providing the thus characterized dichroic film 23 can prevent the fluorescence Y produced in the ceramic phosphor 222 from exiting out of the ceramic phosphor 222 via the heat dissipating substrate 21. The fluorescence Y produced in the ceramic phosphor 222 can thus be efficiently extracted from the ceramic phosphor 222.

The ceramic phosphor 222 has the same configuration as those of the ceramic phosphors 22 and 122 described above. That is, the ceramic phosphor 222 has the phosphor phase 25 and the matrix phase 26.

The ceramic phosphor 222 of the present embodiment emits white illumination light WL1, which is the combination of blue light (transmitted light) E1, which is part of the excitation light E that has not undergone the wavelength conversion but exits via the light exiting surface 222b out of the blue excitation light E outputted from the excitation light source unit 10, and the yellow fluorescence Y produced by the wavelength conversion of the excitation light E performed by the ceramic phosphor 222.

The white balance of the illumination light WL1 emitted from the ceramic phosphor 222 is determined by the ratio between the amount of blue light E1 and the amount of fluorescence Y. In the present specification, the ratio between the amounts of the two types of light is hereinafter referred to as a BY ratio.

The condition for achieving a practical white balance of the illumination light WL1 used in the projector is that the BY ratio ranges from 30% to 50%. The BY ratio is determined in accordance at least with the content of the phosphor phase 25 in the ceramic phosphor 222. The content of the phosphor phase 25 is specified by the YAG ratio.

It is known that the BY ratio is affected by the thickness of the ceramic phosphor 222. For example, a relative reduction in the thickness of the ceramic phosphor 222 having a fixed YAG ratio allows an increase in the amount of blue light E1 that passes through the ceramic phosphor 222. When the thickness of the ceramic phosphor 22 is smaller than 40 μm, however, it is difficult to manufacture the ceramic phosphor 222. Therefore, from the viewpoint of manufacture of the ceramic phosphor 222, the lower limit of the thickness of the ceramic phosphor 222 is desirably 40 μm.

Further, a relative increase in the thickness of the ceramic phosphor 222 having a fixed YAG ratio undesirably reduces the amount of blue light E1 that passes through the ceramic phosphor 222. Further, when the thickness of the ceramic phosphor 222 is greater than 300 μm, the fluorescence Y is reabsorbed in the ceramic phosphor 222, undesirably resulting in a decrease in the amount of fluorescence Y extractable via the light exiting surface 222b. Therefore, from the viewpoint of the efficient use of the fluorescence Y, the upper limit of the thickness of the ceramic phosphor 222 is desirably set as 300 μm.

Based on the viewpoints described above, the thickness of the ceramic phosphor 222 of the present embodiment is set to be greater than or equal to 40 μm but smaller than or equal to 300 μm.

Figure 7:
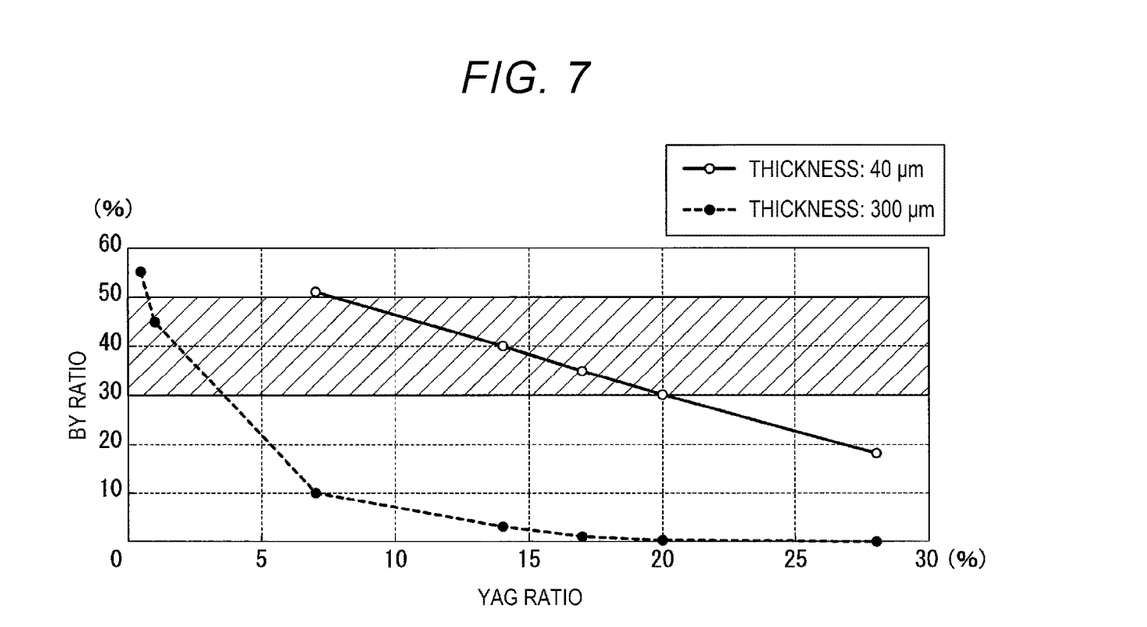
FIG. 7 shows the relationship between a YAG ratio and a BY ratio.

FIG. 7 shows the relationship between the YAG ratio and the BY ratio. In FIG. 7, the horizontal axis represents the YAG ratio (unit: %), and the vertical axis represents the BY ratio (unit: vol %). In FIG. 7, the solid-line graph represents the relationship between the YAG ratio and the BY ratio when the thickness of the ceramic phosphor 222 is the lower limit (40 μm). In FIG. 7, the broken-line graph represents the relationship between the YAG ratio and the BY ratio when the thickness of the ceramic phosphor 222 is the upper limit (300 μm).

FIG. 7 demonstrates that the smaller the YAG ratio, the greater the BY ratio, irrespective of the thickness of the ceramic phosphor 222.

First, consider the case where the thickness of the ceramic phosphor 222 is the lower limit (40 μm).

In the case where the thickness of the ceramic phosphor 222 is 40 μm, FIG. 7 shows that it is preferable to set the YAG ratio at 20 vol % or lower in order to achieve the BY ratio of 30%, which allows a desired white balance of the illumination light WL1 emitted from the ceramic phosphor 222. FIG. 7 further shows that it is preferable to set the YAG ratio at 7 vol % or higher in order to achieve the BY ratio of 50%.

That is, the wavelength converter 220 of the present embodiment allows generation and output of the illumination light WL1 having a desired white balance when the YAG ratio is set at a value greater than or equal to 7 vol % but smaller than or equal to 20 vol % when the thickness of the wavelength converter 220 is 40 μm.

Subsequently, consider the case where the thickness of the ceramic phosphor 222 is the upper limit (300 micrometers).

In the case where the thickness of the ceramic phosphor 222 is 300 μm, FIG. 7 shows that it is preferable to set the YAG ratio at 0.75 vol % or higher in order to achieve the BY ratio of 50%, which allows a desired white balance of the illumination light WL1 emitted from the ceramic phosphor 222. That is, the wavelength converter 220 of the present embodiment allows generation and output of the illumination light WL1 having a desired white balance when the YAG ratio is set at a value greater than or equal to 0.75 vol % when the thickness of the wavelength converter 220 is 300 μm.

As described above, the wavelength converter 220 of the present embodiment includes the ceramic phosphor 222 having a thickness set at a value greater than or equal to 40 μm but smaller than or equal to 300 μm and the YAG ratio set at a value that allows a desired white balance. The wavelength converter 220 therefore allows generation and output of the illumination light WL1 having a desired white balance and high light use efficiency.

In the wavelength converter 220 of the present embodiment, the heat dissipating substrate 21, which is in contact with the ceramic phosphor 222, is formed of a non-light-transmissive member. Therefore, in the wavelength converter 220, the fluorescence Y produced in the ceramic phosphor 222 is efficiently extracted out of the ceramic phosphor 222 with no leakage of the fluorescence Y into the heat dissipating substrate 21.

Since the heat dissipating substrate 21 is in contact with the ceramic phosphor 222 in the portion excluding the through hole 21b, the heat dissipating substrate 21 is in contact with the ceramic phosphor 222 over a smaller area than in the other embodiments. The heat generated in the ceramic phosphor 222 could therefore be less likely to be transferred to the heat dissipating substrate 21. In contrast, since the wavelength converter 220 of the present embodiment includes the matrix phase 26 containing MgO in the form of a light transmissive ceramic material having thermal conductivity higher than that of the phosphor phase 25, the thermal conductivity of the ceramic phosphor 222 is improved, whereby the heat can be efficiently dissipated from the ceramic phosphor 222 toward the heat dissipating substrate 21.

The light source apparatus 2A according to the present embodiment can therefore improve the efficiency at which the fluorescence Y produced by the ceramic phosphor 222 is used while maintaining the heat dissipation performance of the ceramic phosphor 222.

Further, the projector including the light source apparatus 2A according to the present embodiment can also display a high-quality image. Moreover, the wavelength converter 220 of the present embodiment has no light transmissive member provided on the light incident surface 222a of the ceramic phosphor 222. The excitation light E formed on the light incident surface 222a therefore has a small radiation spot, whereby the amount of spread of the fluorescence Y emitted from the ceramic phosphor 222 can be suppressed. The projector according to the present embodiment can therefore efficiently use the illumination light WL1 outputted from the wavelength converter 220, which reduces the etendue of the illumination light WL1.

The present embodiment has been described with reference to the case where the entire heat dissipating substrate 21 is formed of a non-light-transmissive member (metal). The heat dissipating substrate 21 can prevent leakage of the fluorescence Y as long as at least a portion of the heat dissipating substrate 21 that is the portion in contact with the ceramic phosphor 222 is formed of a non-light-transmissive member. The heat dissipating substrate 21 may therefore be so configured that the portion excluding the portion in contact with the ceramic phosphor 222 is formed of a light transmissive member.

Fourth Embodiment

A fourth embodiment of the present disclosure will be described below with reference to FIG. 8.

A schematic configuration of a projector according to the fourth embodiment is the same as that in the third embodiment, and the wavelength converter in the light source apparatus differs in terms of configuration from the wavelength converter of the third embodiment. Therefore, the configuration of the wavelength converter will be described and other configurations will not be described below.

Figure 8:
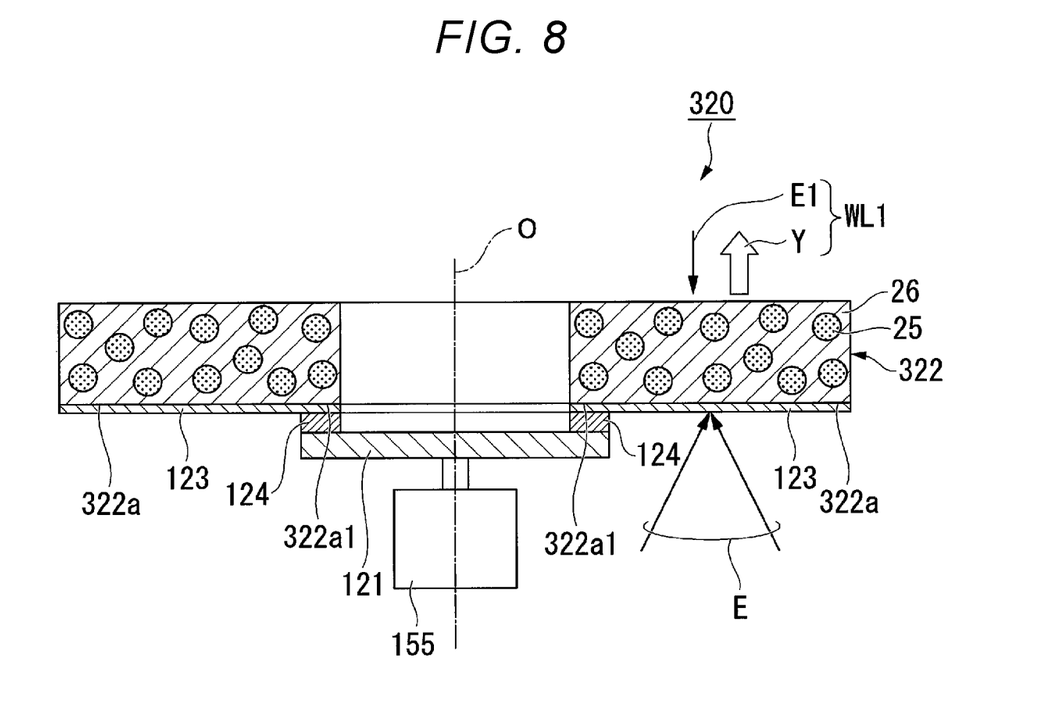
FIG. 8 is a cross-sectional view showing the configurations of key parts of a wavelength converter of a fourth embodiment.

FIG. 8 is a cross-sectional view showing the configurations of key parts of the wavelength converter of the present embodiment. A wavelength converter 320 of the present embodiment includes a heat dissipating substrate 121, a ceramic phosphor 322, a dichroic film 123, a bonding member 124, and the motor (drive apparatus) 155, as shown in FIG. 8. The wavelength converter 320 of the present embodiment is a rotary-wheel-type wavelength converter so configured that a light incident position where the excitation light E is incident on the ceramic phosphor 322 temporally changes.

The heat dissipating substrate 121 in the present embodiment is a circular plate formed of a non-light-transmissive member. The heat dissipating substrate 121 is made of a metal material that excels in heat dissipation performance, for example, aluminum and copper. The substrate 121 is rotatable around the predetermined axis of rotation O. The axis of rotation O passes through the center of the heat dissipating substrate 121. The motor 155 rotates the heat dissipating substrate 121 having the shape of a circular plate around the axis of rotation O.

The ceramic phosphor 322 of the present embodiment is formed in an annular shape around the axis of rotation O. The ceramic phosphor 322 is formed by shaping the ceramic phosphor 222 of the third embodiment in an annular form.

The dichroic film 123 is provided on a light incident surface 322a of the ceramic phosphor 322. The annular ceramic phosphor 322, specifically, a radially inner end section 322a1 of the light incident surface 322a is fixed to the heat dissipating substrate 121 via the bonding member 124. That is, in a plan view in the direction along the axis of rotation O, the ceramic phosphor 322 is so provided as to overhang radially outward beyond the heat dissipating substrate 121. The excitation light E is incident on a portion of the ceramic phosphor 322 that is the portion overhanging radially outward beyond the heat dissipating substrate 121. In the present embodiment, the heat dissipating substrate 121 is in contact with a region of the ceramic phosphor 322 that is the region different from the region on which the excitation light E is incident and dissipates heat generated in the ceramic phosphor 322.

In the wavelength converter 320 of the present embodiment, the excitation light E enters the rotating ceramic phosphor 322. When the excitation light E enters the ceramic phosphor 322, heat is generated in the ceramic phosphor 322. In the present embodiment, the motor 155 rotates the ceramic phosphor 322 to temporally move the light incident position where the excitation light E is incident on the ceramic phosphor 322. The configuration described above suppresses degradation of the ceramic phosphor 322 that occurs in the state in which the excitation light E keeps impinging on the same position on the ceramic phosphor 322 so that only part of the ceramic phosphor 322 is locally heated.

In the present embodiment, not only does the ceramic phosphor 322 have the matrix phase 26 made of MgO, which has high thermal conductivity, but the ceramic phosphor 322 is rotated, whereby the heat dissipation performance can be further enhanced.

Also in the wavelength converter 320 of the present embodiment, the heat dissipating substrate 121, which is in contact with the ceramic phosphor 322, is formed of a non-light transmissive member. Therefore, in the wavelength converter 320, the fluorescence Y produced in the ceramic phosphor 322 is efficiently extracted out of the ceramic phosphor 322 with no leakage of the fluorescence Y into the heat dissipating substrate 121.

According to the wavelength converter 320 of the present embodiment, which includes the ceramic phosphor 322 having high thermal conductivity, the heat can be efficiently dissipated from the ceramic phosphor 322 toward the heat dissipating substrate 121.

The light source apparatus using the wavelength converter 320 according to the present embodiment can therefore improve the efficiency at which the fluorescence Y produced by the ceramic phosphor 322 is used while maintaining the heat dissipation performance of the ceramic phosphor 322. Using the light source apparatus can therefore provide the same effects as those provided in the third embodiment, for example, a projector outputting light having a small etendue and capable of displaying a high-quality image can be provided.

The technical range of the present disclosure is not limited to the embodiments described above, and a variety of changes can be made thereto to the extent that the changes do not depart from the substance of the present disclosure.

For example, in the ceramic phosphors 22, 122, 222, and 322 of the embodiments described above, the phosphor phase 25 contains an oxide phosphor, and the matrix phase 26 contains a metal oxide. In place of the configuration described above, the phosphor phase 25 may contain a nitride phosphor, and the matrix phase 26 may contain a metal nitride. The nitride phosphor can, for example, be α-SiAlON, β-SiAlON, or any other SiAlON phosphor. The metal nitride can, for example, be AlN. The thermal conductivity of AlN is about 255 W/m·K. As described above, when the phosphor phase 25 contains a nitride phosphor and the matrix phase 26 contains the metal nitride, the ceramic phosphor can be stably manufactured, for example, with no unnecessary oxidation reaction in each of the phases.

In addition to the above, the shape, the number, the arrangement, the material, the manufacturing method, and other factors of the components of the ceramic phosphor, the wavelength converter, the light source apparatus, and the projector are not limited to those in the embodiments described above and can be changed as appropriate. In the embodiments described above, the light source apparatus according to the present disclosure is incorporated in a projector using liquid crystal valves by way of example, but not necessarily. For example, the light source apparatus according to the present disclosure may be incorporated in a projector using digital micromirror devices as the light modulators.

Further, the above embodiments have been described with reference to the case where the light source apparatus according to the present disclosure is incorporated in a projector, but not necessarily. The light source apparatus according to the present disclosure may be used as a lighting apparatus, a headlight of an automobile, or any other components.

What is claimed is:

1. A fixed-type wavelength converter comprising:
a heat dissipating substrate that has a through hole that extends through an entire thickness of the heat dissipating substrate;
a dichroic film that is positioned over the through hole, and is provided with the heat dissipating substrate via a bonding member; and
a ceramic phosphor that is provided on the dichroic film, and has a light exiting surface,
wherein:
the ceramic phosphor has a phosphor phase and a matrix phase, and is a ceramic composite that is made of an inorganic material, the phosphor phase contains an activator and a phosphor, the matrix phase contains MgO as a light transmissive ceramic material, a content of the phosphor phase is so set that a volume ratio of the phosphor phase to an entire phase including the matrix phase and the phosphor phase is lower than or equal to 20 vol %, excitation light enters the dichroic film via the through hole of the heat dissipating substrate, and fluorescence produced by the excitation light emits from the light exiting surface of the ceramic phosphor, the ceramic phosphor that a light incident position where the excitation light is incident on the ceramic phosphor does not temporally change, and the heat dissipating substrate is formed of a non-light transmissive member.

2. The fixed-type wavelength converter according to claim 1, wherein the phosphor phase contains at least any one of $Y_3Al_5O_{12}$, $Y_3(Al,Ga)_5O_{12}$, $Lu_3Al_5O_{12}$, and $TbAl_5O_{12}$.

3. The fixed-type wavelength converter according to claim 1, wherein the matrix phase further contains at least any one of $Al_2O_3$, ZnO, $TiO_2$, $Y_2O_3$, $YAlO_3$, BeO, and $MgAl_2O_4$.

4. A light source apparatus comprising:
a light source that outputs excitation light; and
the fixed-type wavelength converter according to claim 1.

5. A projector comprising:
the light source apparatus according to claim 4;
a light modulator that modulates light outputted from the light source apparatus in accordance with image information to form image light; and
a projection optical apparatus that projects the image light.

6. The fixed-type wavelength converter according to claim 1, wherein the ceramic phosphor is provided on an entire surface of the dichroic film.

7. A rotary-wheel-type wavelength converter comprising:
a motor;
a heat dissipating substrate that is rotated by the motor;
a dichroic film that is provided with the heat dissipating substrate via a bonding member, and is so provided as to overhang radially outward beyond an outermost radial edge of the heat dissipating substrate; and a ceramic phosphor that is provided on the dichroic film, is so provided as to overhang radially outward beyond the outermost radial edge of the heat dissipating substrate, and has a light exiting surface, wherein:
the ceramic phosphor has a phosphor phase and a matrix phase, and is a ceramic composite that is made of an inorganic material, the phosphor phase contains an activator and a phosphor, the matrix phase contains MgO as a light transmissive ceramic material, a content of the phosphor phase is so set that a volume ratio of the phosphor phase to an entire phase including the matrix phase and the phosphor phase is lower than or equal to 20 vol %, and excitation light enters the dichroic film, and fluorescence produced by the excitation light emits from the light exiting surface of the ceramic phosphor.

8. The rotary-wheel-type wavelength converter according to claim 7, wherein the phosphor phase contains at least any one of $Y_3Al_5O_{12}$, $Y_3(Al,Ga)_5O_{12}$, $Lu_3Al_5O_{12}$, and $TbAl_5O_{12}$.

9. The rotary-wheel-type wavelength converter according to claim 7, wherein the matrix phase further contains at least any one of $Al_2O_3$, ZnO, $TiO_2$, $Y_2O_3$, $YAlO_3$, BeO, and $MgAl_2O_4$.

10. A light source apparatus comprising:
a light source that outputs excitation light; and
the rotary-wheel-type wavelength converter according to claim 7.

11. The rotary-wheel-type wavelength converter according to claim 7, wherein the ceramic phosphor is provided on an entire surface of the dichroic film.

12. The rotary-wheel-type wavelength converter according to claim 7, wherein the ceramic phosphor has a through hole defining an air space.

13. A projector comprising:
the light source apparatus according to claim 10;
a light modulator that modulates light outputted from the light source apparatus in accordance with image information to form image light; and
a projection optical apparatus that projects the image light.

* * * * *